June 4, 1968 J. C. MUNSON ET AL 3,387,284

LONG DIGITAL DELAY

Filed April 27, 1965 5 Sheets-Sheet 1

INVENTORS
John C. Munson
Joseph A. Faulkner
BY [signature]
ATTORNEY

LONG DIGITAL DELAY
Filed April 27, 1965 5 Sheets-Sheet 2
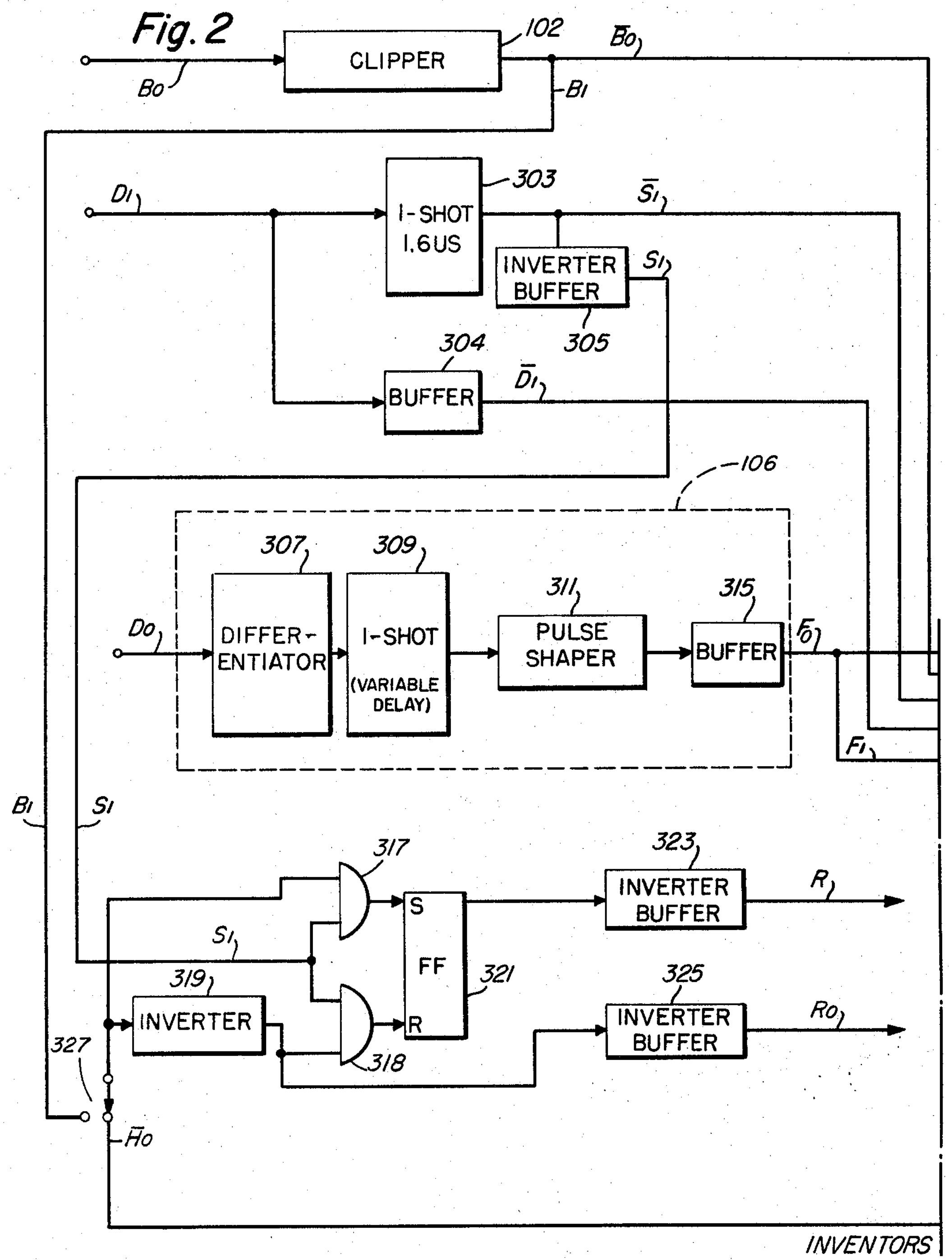
INVENTORS
John C. Munson
Joseph A. Faulkner
BY [signature]
ATTORNEY INVENTORS
John C. Munson
Joseph A. Faulkner
BY
ATTORNEY INVENTORS
John C. Munson
Joseph A. Faulkner
BY
ATTORNEY INVENTORS
John C. Munson
Joseph A. Faulkner
BY
ATTORNEY 3,387,284
Patented June 4, 1968

3,387,284
LONG DIGITAL DELAY

John C. Munson, Silver Spring, and Joseph A. Faulkner, Takoma Park, Md., assignors to the United States of America as represented by the Secretary of the Navy
Filed Apr. 27, 1965, Ser. No. 451,363
7 Claims. (Cl. 340—173)

ABSTRACT OF THE DISCLOSURE

A long digital delay system which provides a long, stable, selectable and precise delay of polarity samples of an input analog signal. The polarity of the input signal is sampled each T seconds and the samples are stored in an interlaced pulse pattern in a circulating loop memory. During sampling a delayed sample is read out of the storage loop such that an output pulse train appears which is a replica of the input sample train except delayed by a selected amount. An add and drop control circuit along with a precessing feature in the loop memory enables new information to be added periodically to the loop while old interlaced information continues to circulate in the loop.

The invention described herein may be manufactured and used by or for the Government of the United States of America for governmental purposes without the payment of any royalties thereon or therefor.

This invention relates to a delay system and more particularly to a delay system for producing long, stable, selectable, and precise delays of samples of analog signals.

In the field of underwater acoustics, programs have been developed to measure the coherency of sound waves between two receivers and between a source and a receiver for investigating the effect of the medium and boundaries upon the sound wave. These programs and others have generated the need for long, precise, stable, distortion and dispersion free delay lines with selectable delay taps.

In the past electromagnetic delay lines have been used for producing relatively short delays but have not proved satisfactory for long delays of broad band signals. Conventional electromagnetic delay lines have inherent distortion and dispersion which become very serious for large delays and their cost and size make them impractical for many acoustic studies.

With the advantage of modern computer techniques it appeared more feasible to develop a recirculating memory device to provide the long delays necessary for the present problem. The invention, therefore, contemplates a delay apparatus which uses a circulating loop memory as a storage medium for sample pulses of an audio signal which permits continuous storage of sample information and reads out a replica of an input sample train after being delayed by a preselected amount. The storage medium has a series of delay lines with selectable output taps and the circulating pulses are clocked and standardized in shape each time they enter a delay line so that the attenuation, dispersion, and delay stability requirements for the overall system having a plurality of delay lines are reduced to those of a single delay line.

Accordingly, an object of the present invention is to provide a delay apparatus which gives long delays to incoming signal trains which are precise and stable, which are not distorted or dispersed, and which are reliable replicas of the input signal.

Another object is the provision of a storage medium having a plurality of delay line sections which will store a large quantity of information that can be selectably read out after a predetermined delay time, and which will recirculate stored information continuously except when new information is being added to the storage medium.

Still another object is to provide a delay apparatus for the study of audio frequency signals by sampling the signals, storing samples of said signals for a predetermined time interval in a recirculating loop memory device and automatically reading out said signal samples after a predetermined time interval, wherein said readout signal samples are replicas of the input sample signals except delayed by said predetermined time interval.

With these and other objects in view, as will hereinafter more fully appear, and which will be more particularly pointed out in the appended claims, reference is now made to the following description taken in connection with the accompanying drawings in which:

FIGS. 2, 3, 4 and 5 illustrate a detailed block diagram of the system of FIG. 1.

Figures 1, 6:
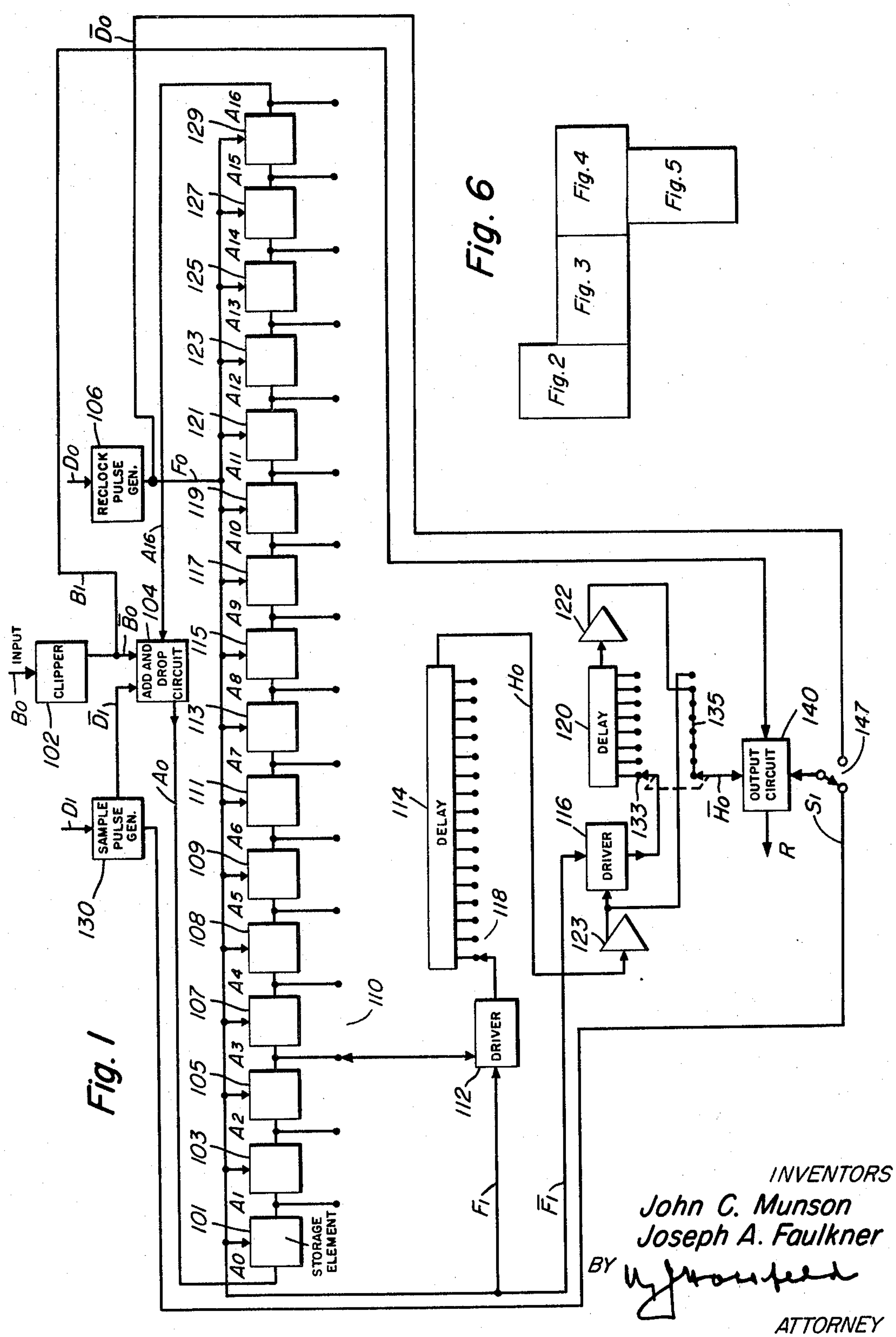
FIG. 1 illustrates a block diagram of one embodiment of the invention.
FIG. 6 shows the manner in which FIGS. 2, 3, 4 and 5 fit together.
Figure 3:
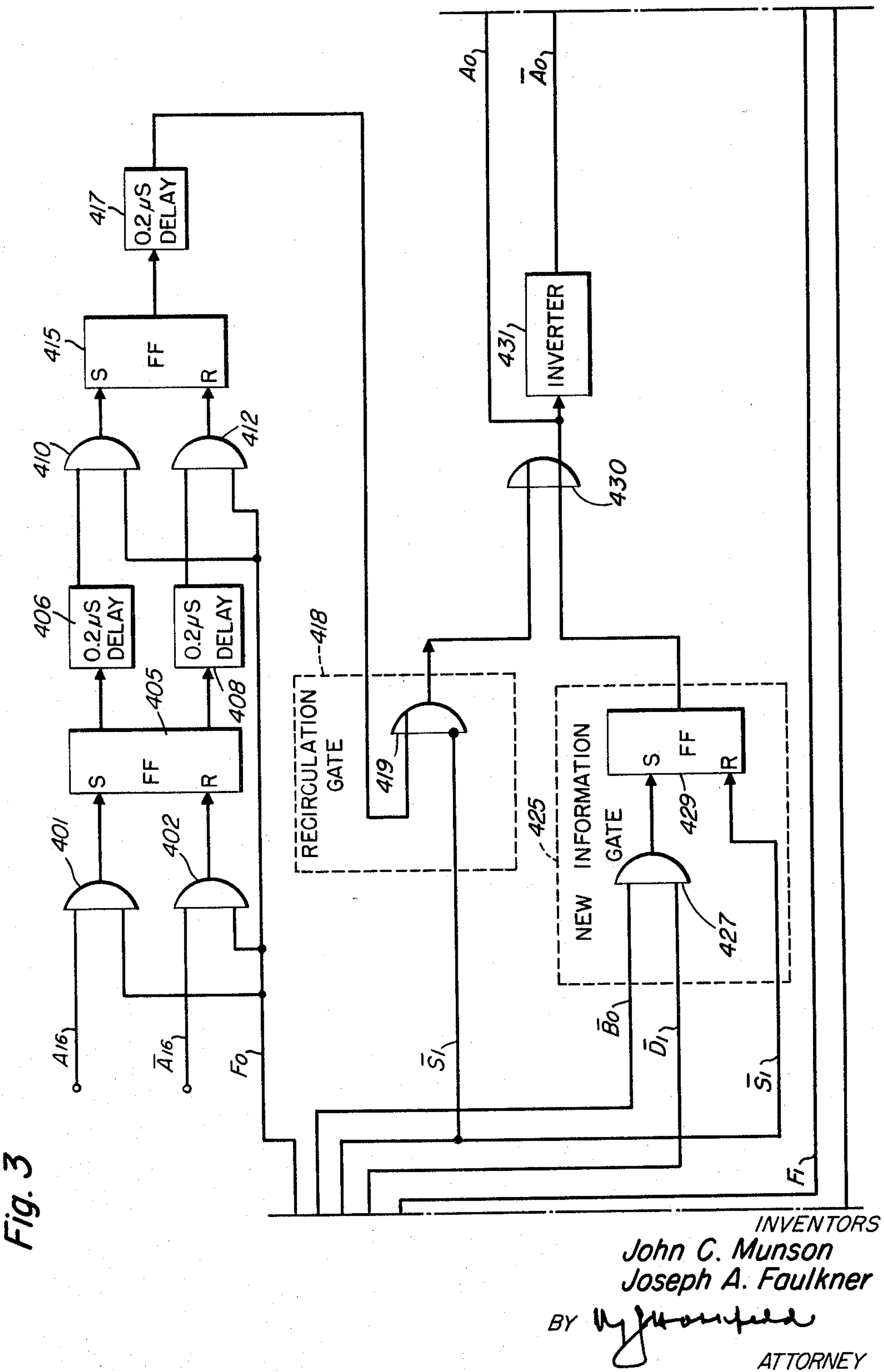
Figure 4:
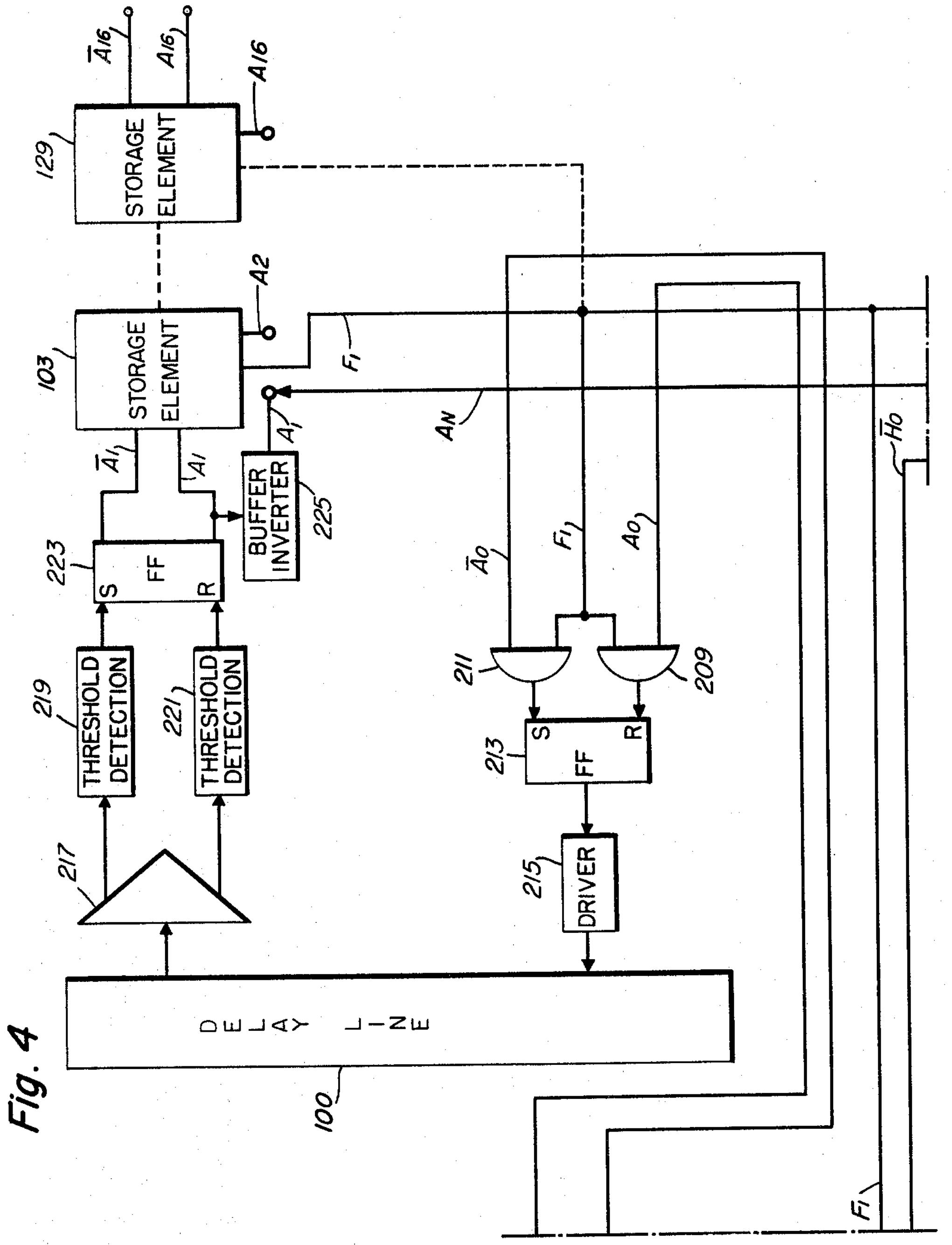
Figure 5:
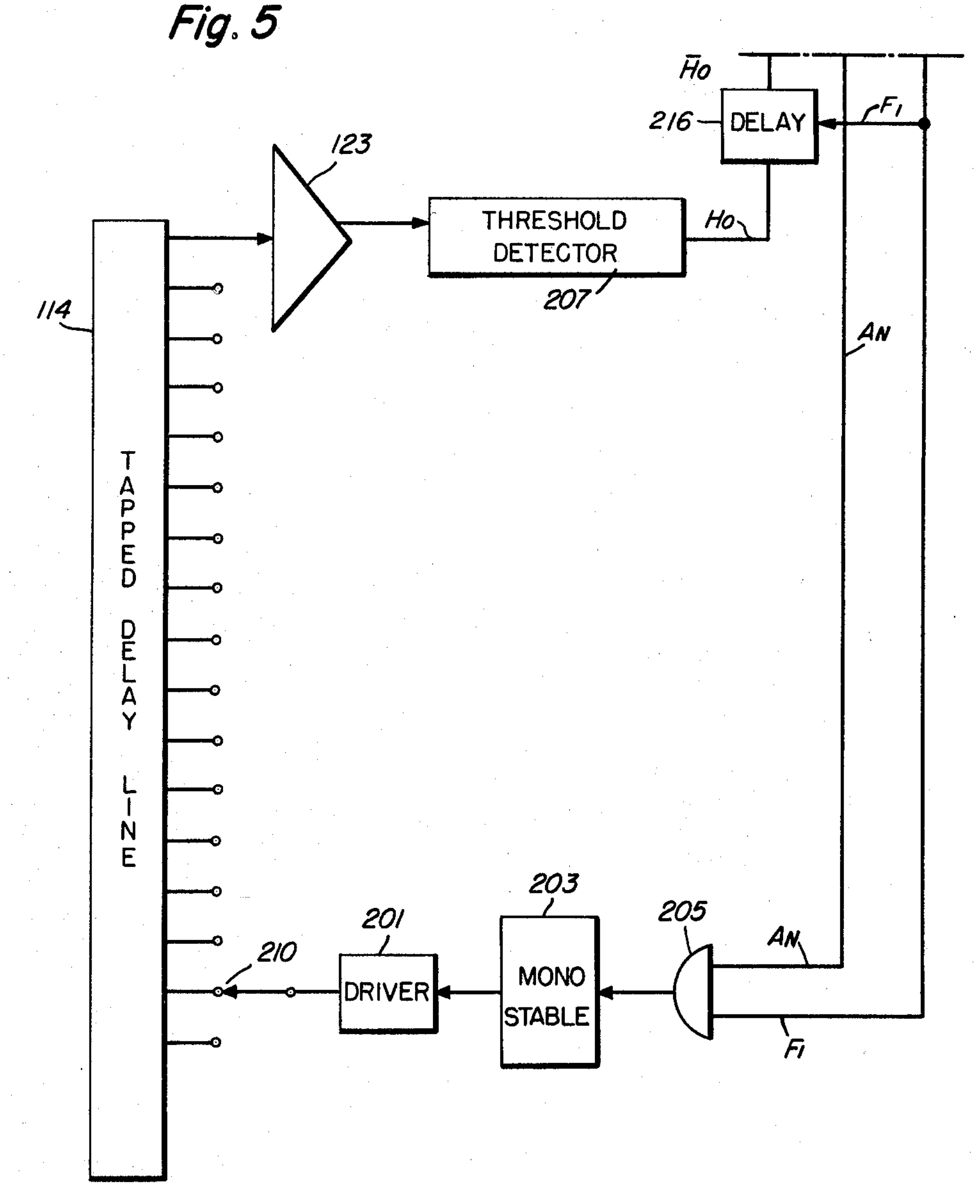

FIG. 1 illustrates an embodiment of the invention in which long digital delays are provided for sample pulses of an input audio signal $B_0$, stored in storage elements 101 to 129 and read out from a preselected output tap such as $A_3$ to eventually give an output signal R from output circuit 140 which is a delayed replica of the input sample pulse train. In this embodiment polarity samples of the input are delayed rather than the actual analog signal $B_0$ input to clipper 102. The polarity of the input is sampled each T seconds and these samples are inserted by way of add and drop circuit 104 into the circulating storage loop composed of storage elements 101 to 129 and add and drop circuit 104. The readout portion of the system may be adjusted so that each T seconds the output circuit reads out from the circulating loop the pulse which has been stored for a selected time so that the output pulse train is a replica of the input sample train, except delayed by a selected amount which is determined by the settings of switches 110, 118, and 133.

Add and drop circuit 104 has inputs from the sample pulse generator 130 over line $\overline{D_1}$, from clipper 102 over line $\overline{B_0}$, from reclock pulse generator 106 over line $F_0$, and from output terminal $A_{16}$ of the storage element 129. Either a bit is recirculated from $A_{16}$ to storage element 101 or a new information sample is added to the memory loop over lead $A_0$. Every T seconds new information will be added at which time the oldest sample stored is simultaneously dropped. The time T is chosen to be multiple of $\Delta$, the time width of a single circulating sample, and the length of the circulating loop is $(N-1)\Delta$, where N is a multiple of $T/\Delta$ The loop contains $N/M$ storage elements, all except one containing M samples (or bits) and one containing $(M-1)$ samples, where M is a multiple of $T/\Delta$. The samples precess one bit with respect to the sample pulse time for each circulation around the loop. So it is necessary to delay a circulating pulse train P bits in order to readout a signal that has been stored for P circulations. This is accomplished by having storage element 101 made 1 bit short (i.e., containing $M-1$ bits) so that after each circulation, the pulse train is precessed an additional bit. The vernier delays 114 and 120 are adjusted to compensate for the number of bits of precession for P circulations so that the appropriate pulse train is read out. For some applications the number of circulations P may be very large. Therefore for simplicity of operation the vernier delay is broken into two segments as shown in the block diagram of FIG. 1.

In practice, the minimum delay possible on the readout was 3 bits, so the length of the first line is made 3 bits short. A 2 bit delay is then added in the recirculation loop just prior to the add and drop gate to make the total loop one bit short as required.

If $M\Delta$ is assumed to be the length of a delay line in each of the stroage elements where M is an integral multiple of $T/\Delta$, P is the number of circulations of a pulse train around the loop, and Q is a particular line output, a delay may be selected equal to $(PN+QM)\Delta$.

For the specific implementation shown in FIG. 1, storage elements 101 to 129 form a circulating loop which is capable of storing 65,535 bits $(2^{16}-1)$. Each storage element has a capacity of 4096 $(2^{12})$ bits, except storage element 101 which is made one bit shorter. The bit rate $1/\Delta$ for this application was chosen to be precisely $^{32}/_{52}$ mc., which is about 615 kc. Thus the time width for a single circulating sample $\Delta$, is approximately 1.6 microseconds, and is supplied from reclock pulse generator 106 having an input $D_0$ from a central synchronizing clock position (not shown).

The minimum delay increment for the particular system parameters chosen is 4096 bits, or 6656 micorseconds, while the maximum delay is $2^{16}T$. Thus, if the interval between samples is $^{52}/_{32}$ microseconds$\approx$1.6 microseconds, delays can be selected up to 0.106496 second in increments of 6656 microseconds. If the sampling interval is 52 microseconds the maximum delay is 3.407872 seconds, whereas if it is 6656 microseconds the maximum delay is 436.207616 seconds$\approx$7 minutes. The extreme flexibility of the device is seen here in that it can operate at any sample rate T which is a multiple of $\Delta$ with no change in the device.

Reclock pulse generator 106 supplies a reclock pulse approximately .15 microsecond wide at 615 kc. to each of the storage elements 101 to 129. The reclock pulse generator 106, therefore, reshapes the pulse leaving each storage element before entering the next storage element. It also supplies a clocking pulse to drivers 112 and 116 of vernier delays 114 and 120 over leads $F_1$ and $\overline{F}_1$.

Readout is accomplished by either strobing the circulating pulse train with the sample pulse train (over lead $S_1$), so that when samples are read in they are simultaneously read out, or else by strobing with reclock pulse generator 106 over lead $\overline{D}_0$. If generator 106 is used, a replica of the pulse train circulating in the loop except delayed by a predetermined amount is obtained. If generator 130 provides the strobing pulse, the output will be a pulse train which changes polarity only at the time of a sample pulse.

It is to be undestood, of course, that any number of storage elements could be used and might be arranged in parallel or any suitable manner for receiving quantized inputs as well as polarity binary inputs. Also it is within the scope of this invention to have a plurality of readout circuits.

For a more detailed description of the embodiment of FIG. 1, reference is made to FIGS. 2, 3, 4 and 5 arranged in the manner shown in FIG. 6. Clipper 102 continuously detects the polarity of incoming signal $B_0$ and always supplies a signal over lead $\overline{B}_0$ to the new information gate 425 shown in FIG. 3. When an incoming sample pulse approximately .10 microsecond wide is received over lead $D_1$ a pulse over lead $\overline{D}_1$ through buffer 304 opens AND gate 427 and passes a set signal to flip-flop device 429 which is reset by a signal on lead $\overline{S}_1$. At the same time a 1.6 microseconds wide pulse from one-shot pulse generator 303 travels over lead $\overline{S}_1$ and closes the normally open gate 419 for the length of the pulse. The one-shot pulse also is supplied through inverter buffer 305 over lead $S_1$ to the output AND gates 317 and 318.

A synchronizing clock pulse is supplied over lead $D_0$ to the reclock pulse generator 106 consisting of a differentiator 307, a one-shot variable delay 309, pulse shaper 311, and a buffer 315 to give a .15 microsecond wide synchronizing pulse to AND gates 401, 402, 410 and 412 of the add and drop circuit 104 over lead $F_0$. The same clocking pulse is supplied over lead $F_1$ to AND gates such as 211 and 209 of the storage elements and also AND gates of the driver circuit for the vernier delays, such as AND gate 205. As shown in FIG. 1, the reclock pulse output might be used to strobe the output circuit 140 in lieu of the sample pulse if so desired.

When sample information is present flip-flop device 429 sends a signal through OR gate 430 through inverter 431 and over lead $\overline{A}_0$ to AND gate 211 of the first storage element 101, and a complementary signal from OR gate 430 over lead $A_0$ to AND gate 209.

Magnetostrictive delay line 100 has an input from driver 215 which is energized from flip-flop device 213 gated by AND gates 211 and 209. Nonreturn to zero logic is used in the storage elements and allows operation at double the bit rate possible with conventional return to zero logic. A square pulse of current applied to the input transducer of a magnetostrictive delay line results in a pair of doublet pulses appearing at the output of the delay line to amplifier 217. Threshold detector 219 detects positive pulses and sets flip-flop 223 into the one state and negative pulse reset flip-flop 223 into the zero state when detected by threshold detector 221. If the flip-flop is already in a set position when a set pulse appears or in a reset position when a reset pulse appears, there will be no change in the flip-flop output. The outputs on leads $A_1$ and $\overline{A}_1$ are complements of each other and provide a delayed replica of the input current to delay line 100. By using the polarity of the doublet pulses it is possible to pass information through the storage element even when the pulses overlap. Each storage element 103, 129, etc. has an output through a buffer inverter such as inverter 225 over lead $A_N$ to the vernier delays.

The signals from the 16th storage element on leads $A_{16}$ and $\overline{A}_{16}$ are delayed by two bits, for example, 3.2 microseconds, and then passed through the recirculation gate 418. The recirculation gate is normally open, for recirculation but it is closed for $\Delta$, for example 1.6 microseconds, when a sample is being inserted, at which time the new information gate is open. The recirculation and new information gates are in parallel, so that either a recirculated sample or a new information sample is passed each recycle. The output of the paralleled recirculation and new information gates, and the complement of this output, form the two signal inputs to the first storage element 101 over leads $A_0$ and $\overline{A}_0$.

A two bit delay is accomplished by the shift resistor comprising flip-flops 405 and 415. When signals either set or reset flip-flop 405 the output is delayed by the appropriate delay 406 or 408 for .2 microsecond and then sent to AND gate 410 or 412 before applying to flip-flop 415. Since the reclock pulses are 0.15 microsecond wide shift register action is obtained and the output of the second flip-flop is a replica of the input to the first flip-flop delayed by two bits. The output of the second flip-flop 415 is delayed by 0.2 microsecond by delay device 417 in order to assure that the flip-flop in the first storage element will operate on the current cycle of the reclock pulse train.

The new information or input signal is sampled by performing the logical AND between the sample pulse $\overline{D}_1$ and the polarity of the new information. Since the sampled pulse is only 0.10 microsecond wide the polarity sample is widened in a flip-flop to 1.6 microseconds. This is done by setting the flip-flop 429 with the polarity sample and the resetting it 1.6 microseconds later. The reset pulse is the same one as $\overline{S}_1$ which is used to close the recirculation gate at the appropriate time and it is a pulse which is a binary 1 except for the 1.6 microsecond period following the commencement of the sample pulse.

A reclock pulse on lead $F_1$ and a readout pulse on lead $A_N$ operate gate 205, which provides a signal to monostable device 203 which operates driver 201 to give an input to delay line 114 for a delayed output $H_0$. The output $H_0$ is passed through a second vernier delay 216 to provide a further delayed output $\overline{H}_0$ to the readout circuitry in FIG. 2. Tapped magnetostrictive delay lines are used for both delay line 114 and 120. The input from lead $A_N$ is strobed with the reclock pulse generator and used to set a monostable multivibrator 203 which reverts back to its stable state in about 0.8 microsecond. This generates a current pulse in the delay lines which results in the output of a large pulse 0.8 microsecond wide flanked by two half size 0.8 microsecond pulses of opposite polarity. The input is fed through a switch to the selected tap on the delay line, while the output is permanently connected to one tap. The delay line is fed through amplifier 123 and a single thresholded output is obtained over detector 207 to drive vernier delay 216.

Both an unclocked output $R_0$ and a clocked output R may be obtained from the output circuit shown in FIG. 2. A clocked pulse R is produced when either a signal through inverter 319 to AND gate 318 at the time a signal is on lead $S_1$ resets flip-flop 321 or when a signal through AND gate 317 sets flip-flop 321. An unclocked signal $R_0$ is obtained by a signal through inverter 319 bypassing the AND logic and producing a signal through inverter buffer 325. To obtain a zero delay output, clipper 102 may be directly connected to the output circuit 140 through switch 327.

From the foregoing it is apparent that a long digital delay system has been developed which provides long, stable, precise, distortion-, and dispersion-free delays for sample pulse trains of an input signal, but various modifications are contemplated and may obviously be resorted to by those skilled in the art without departing from the spirit and scope of the invention, as hereinafter defined by the appended claims.

What is claimed and desired to be secured by Letters Patent of the United States is:

1. A long delay system for providing long digital pulse train delays of samples of analog signals comprising in combination, means for periodically sampling said analog signal to supply a plurality of sample information signal inputs, a memory device having a plurality of serially connected storing elements in a circulating loop, each of said elements having a delay line delaying input information pulses for a predetermined incremental delay, said loop being one bit short of a multiple of the time between samples divided by the time width of a single circulating sample, said delay lines equal in length except the first of said delay lines which is shorter by a predetermined number of bits, pulse reshaping means electrically connected between the output of each delay line of a storage element and the input of the next storage element for reshaping sample signals after each incremental delay, an information control circuit electrically connected between the first of said storage elements and the last of said storage elements including, means for recirculating storage information pulses in said memory device, means for inhibiting said recirculation means when input information pulses are initially received and means for storing said input information in said memory device for a predetermined delay, timing control means forming synchronizing clock pulses and input sampling clock pulses, and readout means electrically connectable to an output of a predetermined storage element being responsive to the coincidence of a delay line output pulse and a clock pulse for providing a delayed digital pulse train output, whereby long, precise, dispersion free and distortion free delays of a plurality of sample train inputs are achieved.

2. The system of claim 1 wherein said control means comprises, a shift register for delaying a circulating pulse train by an additional delay which is equal to some constant minus one bits of delay, where the constant is equal to said predetermined number of bits, a recirculating gate having an input from said shift register and an output to said first storage element, and an information gate having an input for a new information signal and an output to the first of said storage elements, said gates arranged in parallel so that said information gate is open when said recirculation gate is closed.

3. The system of claim 1 further comprising vernier delay means adjustable to exactly compensate for the number of bits precessed at a rate of one bit per revolution of recirculating sample signal, wherein said vernier delay means consists of a first tapped delay line and a second tapped delay line in series between said preselected storage element output and said readout means.

4. A delay apparatus for providing long selectable delays for pulse train information signals comprising, in combination, first pulse generator means for sampling an input signal and providing a sample pulse train information signal, a plurality of storage devices forming a circulating loop each having a delay line section having a selectable incremental delay time, the first of said delay line sections having a shorter delay time than the rest of said sections, information signal receiving means in each of said storage devices, pulse reshaping means connected between the output of each delay line and the receiving means of the next storage device, information storage control means connected between the first one of said storage devices and the last one of said storage devices, means included in said storage control means for recirculating stored information signals in said devices when pulse train information signals are not being received, means included in said storage means responsive to the output of said first pulse generator for inhibiting said recirculation means and for storing said pulse information signals in said storage devices for a predetermined length of time, second pulse generator means supplying parallel timing signal pulses to each of said storage devices and also supplying output gating pulses, and readout circuitry connected to a preselected storage element output terminal and said first pulse generator for providing a delayed pulse train readout signal in response to the coincidence of a sample pulse generator pulse and an output signal from said selected delay line output.

5. The apparatus of claim 4 wherein said control means comprises, a shift register for delaying a circulating pulse train by an additional delay, a recirculating gate having an input from said shift register and an output to said first storage element, and an information gate having an input for a new information signal and an output to the first of said storage elements, said gates arranged in parallel so that said information gate is open when said recirculation gate is closed.

6. The apparatus of claim 4 further comprising vernier delay means adjustable to exactly compensate for the number of bits precessed by said storage means when a sample circulates around said loop, wherein said vernier delay means consists of a first tapped delay line and a second tapped delay line in series between said preselected storage element output and said readout means.

7. In a long delay system comprising in combination, means for accepting and sampling an analog signal in variable periodic time intervals to supply sample information signals of said analog signal, digital storage means for storing large pluralities of said sample information signals in an interlaced relationship for long, precise intervals of time, said storage means having a plurality of delay line sections, each of said sections providing an incremental delay, pulse reshaping means electrically connected between the output of each delay line section and the input of the next delay line section for reshaping sample signals after each incremental delay, control means connected between said sampling means and said storage means having means for periodically adding new sample information signals to said storage means and including recirculating means for circulating said plurality of interlaced sample information signals in said storage means for a predetermined period of time, selective means included in said digital storage means for selecting delays in accordance with preselected desired delay times, and readout means responsive to the elapsing of a selected predetermined delay for providing a delay digital pulse train output which is an exact replica of said input sample train.

References Cited

UNITED STATES PATENTS

| | | | |
|---|---|---|---|
| 3,222,670 | 12/1965 | Harel | 340—172.5 |
| 3,302,176 | 1/1967 | McLaughlin | 340—172.5 |
| 3,309,671 | 3/1967 | Lekven | 340—172.5 |

BERNARD KONICK, *Primary Examiner.*

J. F. BREIMAYER, *Assistant Examiner.*